(12) United States Patent
Salcedo

(10) Patent No.: US 12,460,729 B2
(45) Date of Patent: *Nov. 4, 2025

(54) PRESSURE REGULATING VALVE

(71) Applicant: Ultra Flow Holdings, LLC, Greenwich, CT (US)

(72) Inventor: Steve J. Salcedo, Canton, CT (US)

(73) Assignee: ULTRA FLOW HOLDINGS, LLC, Greenwich, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,779

(22) Filed: Dec. 14, 2023

(65) Prior Publication Data

US 2024/0110629 A1 Apr. 4, 2024

Related U.S. Application Data

(63) Continuation of application No. 17/860,311, filed on Jul. 8, 2022, now Pat. No. 11,885,419.

(51) Int. Cl.

| | |
|---|---|
| *F16K 1/30* | (2006.01) |
| *B67D 1/12* | (2006.01) |
| *F16K 1/42* | (2006.01) |
| *F16K 1/46* | (2006.01) |
| *G05D 16/06* | (2006.01) |

(52) U.S. Cl.
CPC .............. *F16K 1/306* (2013.01); *B67D 1/125* (2013.01); *F16K 1/42* (2013.01); *F16K 1/46* (2013.01); *G05D 16/0663* (2013.01); *Y10T 137/7826* (2015.04)

(58) Field of Classification Search
CPC ......... Y10T 137/7821; Y10T 137/7825; Y10T 137/7826

See application file for complete search history.

(56) References Cited

U.S. PATENT DOCUMENTS

| | | | | |
|---|---|---|---|---|
| 1,566,255 | A | * | 12/1925 | Spreen ................... F25B 41/335 137/505.42 |
| 2,663,122 | A | * | 12/1953 | Cornelius .......... G05D 16/0655 251/281 |
| 2,878,830 | A | * | 3/1959 | Wiedmann .......... F24D 19/1051 137/505.11 |
| 3,250,288 | A | * | 5/1966 | Hammon ........... G05D 16/0663 137/116.3 |

(Continued)

FOREIGN PATENT DOCUMENTS

WO 9927282 6/1999

*Primary Examiner* — Robert K Arundale
(74) *Attorney, Agent, or Firm* — Dickinson Wright PLLC

(57) ABSTRACT

A pressure regulating valve including a seal seat that defines an opening. A seat stem is moveable between a closed position in which the seat stem engages the seal seat and prevents fluid flow through the opening, and an open position in which the seat stem is spaced from the seal seat and permits fluid flow through the opening. A biasing element biases the seat stem in the closed position. A housing defines a passage that extends between an inlet and an outlet. The seal seat, seat stem and biasing element are positioned in the passage such that movement of the seat stem between the closed and open positions controls flow of the fluid between the inlet and outlet. The housing has an outer wall including a coupling mechanism for fixing the housing inside a channel of a primary regulator body.

13 Claims, 4 Drawing Sheets

(56) References Cited

U.S. PATENT DOCUMENTS

| | | | |
|---|---|---|---|
| 3,712,333 A * | 1/1973 | Semon | F16K 31/365 |
| | | | 137/116.5 |
| 4,471,802 A * | 9/1984 | Pryor | G05D 16/0666 |
| | | | 137/505.42 |
| 4,719,940 A * | 1/1988 | Beavers | G05D 16/0663 |
| | | | 137/505.39 |
| 5,048,565 A | 9/1991 | Oi | |
| 5,129,423 A | 7/1992 | Fournier et al. | |
| 5,555,908 A | 9/1996 | Edwards et al. | |
| 5,582,202 A | 12/1996 | Schultz et al. | |
| 7,077,157 B2 | 7/2006 | Cavagna | |
| 7,594,639 B2 | 9/2009 | Birch | |
| 8,684,330 B2 | 4/2014 | Collado | |
| 2011/0000553 A1 * | 1/2011 | Clifford | F16K 17/00 |
| | | | 137/454.6 |
| 2011/0174395 A1 * | 7/2011 | Clifford | G05D 16/0633 |
| | | | 137/510 |
| 2012/0241658 A1 * | 9/2012 | Clifford | F16K 17/085 |
| | | | 251/321 |
| 2012/0241659 A1 * | 9/2012 | Clifford | F16K 31/1264 |
| | | | 137/15.18 |

* cited by examiner

PRESSURE REGULATING VALVE

CROSS-REFERENCES TO RELATED APPLICATION

This patent application is a continuation of U.S. patent application Ser. No. 17/860,311, filed on Jul. 8, 2022, the entire disclosure of which is incorporated herein by reference.

FIELD OF THE DISCLOSURE

The present disclosure relates to pressure regulating valves, such as those used to regulate a pressure of fluid entering a consumer device like a carbonated beverage dispenser.

BACKGROUND OF THE DISCLOSURE

This section provides background information related to the present disclosure which is not necessarily prior art.

It is known in the beverage industry to use carbon dioxide ($CO_2$), or other gasses, to carbonate beverages and to move the beverages from a storage tank to a dispensing mechanism. For example, a "post mix" soda dispenser typically include a source of $CO_2$, a source of water, a carbonator for mixing the water and $CO_2$, and a syrup pump for drawing from a source of flavored syrup. Under this system, the syrup is combined with the carbonated water while the beverage is dispensed.

Such beverage systems typically include a pressure regulating assembly that is located adjacent to an outlet of the source of $CO_2$ for regulating a pressure of $CO_2$ escaping the source of $CO_2$ prior to being delivered to the carbonator. Pressure regulating assemblies typically include a regulator body which defines a channel that is fluidly connected to the gas source. A seal seat of a flexible material, such as Teflon® is located in the channel and is selectively engaged by a seat stem which is moveable between a closed position in which the seat stem engages the seal seat to seal the passage, and an open position in which the seat stem is spaced from the passage, permitting gas to flow through the channel. A spring biases the seat stem in the closed position, and a stem pin selectively moves the seal seat between the open and closed positions in response to rotation of a handle by an operator to adjust an amount of flow through the channel.

It is known for such seal seats to fail after prolonged use, thereby requiring replacement. An issue with such assemblies is a replacement seal seat can unknowingly be defective or damaged prior to installation, and the seal may only be tested after installation of the seal seat at the site where the beverage dispenser is located.

Accordingly, there remains a need for improvements to such pressure regulating assemblies.

SUMMARY OF THE DISCLOSURE

This section provides a general summary of the disclosure and is not intended to be interpreted as a comprehensive listing of its full scope or of all of its objects, aspects, features and/or advantages.

A pressure regulating valve is provided for use with a pressure regulating assembly for regulating a flow of a fluid from a source of the fluid to a fluid consumer. The pressure regulating valve includes a seal seat that defines an opening. A seat stem is moveable between a closed position in which the seat stem engages the seal seat and prevents a flow of fluid through the opening of the seal seat, and an open position in which the seat stem is spaced from the seal seat and permits a flow of the fluid through the opening of the seal seat. A biasing element biases the seat stem in the closed position. A housing defines a passage that extends between an inlet and an outlet. The seal seat, seat stem and biasing element are positioned in the passage of the housing such that movement of the seat stem between the closed and open positions permits or prevents the flow of the fluid between the inlet and outlet of the housing. A coupling mechanism fixes the housing inside a channel of a regulator body of the pressure regulating assembly.

Because the seal seat is located in a housing that is independent of the primary regulator body, the seal seat may be tested prior to shipping and installation at a job site. This saves time and material costs by ensuring that a reliable seal seat is installed at the job site. Furthermore, the housing may easily be retrofitted into channels of existing primary regulator bodies, thus providing a simple, quick installation process for seal seat replacements.

DRAWINGS

The drawings described herein are for illustrative purposes only of selected embodiments and not all possible implementations thereof such that the drawings are not intended to limit the scope of the present disclosure.

DETAILED DESCRIPTION OF THE EXAMPLE EMBODIMENTS

Example embodiments of a pressure regulating assembly and associated pressure regulating valve will now be described more fully with reference to the accompanying drawings. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiments may be embodied in many different forms that may be combined in various ways, and that neither should be construed to limit the scope of the disclosure. In some example embodiments, well-known processes, well-known device structures, and well-known technologies are not described in detail.

Figure 1:
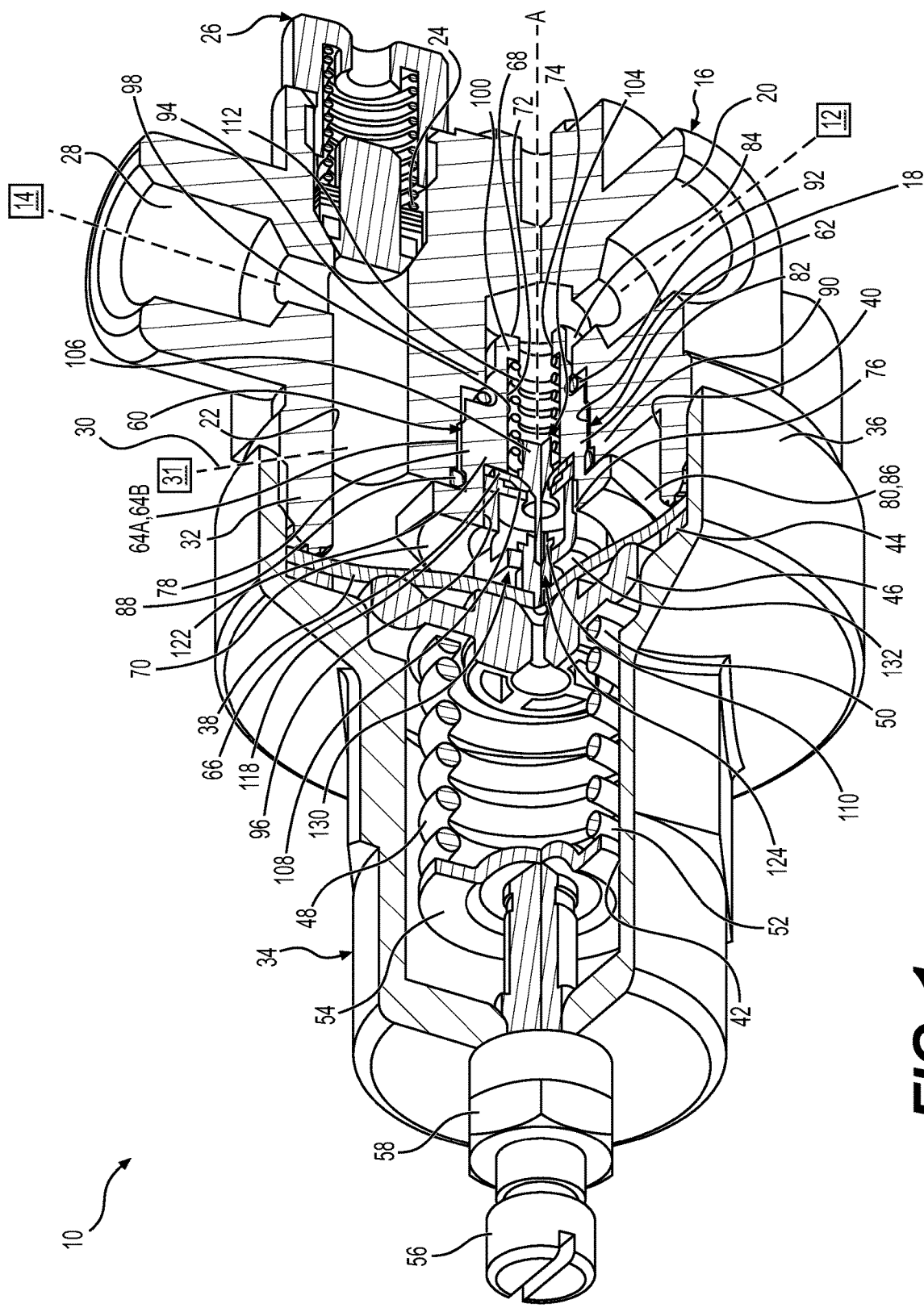
FIG. 1 is perspective, cutaway view of an example embodiment of a pressure regulating assembly including a pressure regulating valve.

More particularly, referring to the figures, wherein like numerals indicate corresponding parts throughout the several views, are shown. A pressure regulating assembly 10 is shown. As best shown in FIG. 1, the pressure regulating assembly 10 is configured to regulate a flow of a fluid from a source of fluid 12 (schematically shown) to a consuming mechanism 14 (schematically shown). For example, the pressure regulating assembly 10 may be configured to regulate a flow of $CO_2$ from a source of $CO_2$ gas to a carbonated beverage dispensing machine like a "fountain drink" dispenser. The pressure regulating assembly 10 could also be employed to regulate a flow of other fluids (e.g., nitrous oxide) to various other types of consumers (e.g., a beer dispenser). Although the subsequent discussion primarily references the use of the pressure regulating assembly 10 with gas, it should be appreciated that it could also be used to regulate a flow of other fluids.

The pressure regulating assembly 10 includes a primary regulator body 16. The primary regulator body 16 defines a central channel 18 along a central axis A. The central channel 18 is open at a top of the primary regulator body 16. The primary regulator body 16 further defines a primary inlet 20 that extends radially to the central channel 18 and is fluidly connected to the central channel 18. The primary inlet 20 is configured to receive a fluid from the source of fluid 12. The primary regulator body 16 further defines an output channel 22 that is fluidly connected to the central channel 18 at the top of the primary regulator body 16. The output channel 22 extends parallel to the central axis A to an emergency outlet 24. An emergency check valve 26 is located in the emergency outlet 24 for permitting the gas to escape the output channel 22 in an event that a pressure of the gas in the primary regulator body 16 rises above a predetermined level. The primary regulator body 16 further defines a primary outlet 28 that extends radially to the output channel 22. The primary outlet 28 is configured to be connected to the consumer 14 of the fluid for delivering the fluid to the consumer.

The primary regulator body 16 further defines at least one pressure gauge passage 30 (schematically shown) that extends into the output channel 22, or any other region of the primary regulator body 16 for monitoring a fluid pressure in the primary regulator body 16 via a pressure gauge 31 (schematically shown). It should be appreciated that various types of pressure gauges could be used and they could detect a pressure at various regions of the primary regulator body 16.

The primary regulator body 16 further presents a first annular rim 32 that extends about the axis A above the central channel 18 at the top of the primary regulator body 16. A cover 34 overlies the primary regulator body 16 above the central channel 18. The cover 34 has a second annular rim 36 that receives, and is sealingly connected to the first annular rim 32 of the primary regulator body 16. The cover 34 defines a compartment that fluidly connects the central channel 18 with the output channel 22.

A generally disc-shaped diaphragm seal 38 extends across a top of the first annular rim 32 and divides the compartment into a lower compartment space 40 beneath the diaphragm seal 38 and an upper compartment space 42 above the diaphragm seal 38. The lower compartment space 40 is sealed relative to the upper compartment space 42 via the diaphragm seal 38 such that pressurized fluid that is traveling between the central channel 18 and the outlet channel 22 is confined to the lower compartment space 40.

A ring-shaped regulator gasket 44 is positioned axially above and against the diaphragm seal 38 along a perimeter of the diaphragm seal 38. The cover 34 axially engages the regular gasket 44, thereby axially sealing the diaphragm seal 38 between the regulator gasket 44 and the first annular rim 32.

A diaphragm seat 46 is positioned in the upper compartment space 42 axially against the diaphragm seal 38. The diaphragm seat 46 is axially moveable within the upper compartment space 42. A cover biasing element 48, such as a spring, is positioned about the axis A in the upper compartment space 42 and includes a bottom end 50 that engages the diaphragm seat 46, and a top end 52 that engages a spring seat 54 such that the bottom end 50 biases the diaphragm seat 46 downwardly. An adjustment screw 56 extends through a top of the cover 34 along the axis A and axially engages a top of the spring seat 54. A nut 58 is positioned above the cover 34 along the axis A and threadedly receives the adjustment screw 56 such that rotation of the adjustment screw 56 axially moves the diaphragm seat 46, thereby compressing or relieving the cover biasing element 48 in order to increase or decrease movement of the diaphragm seat 46 against the diaphragm seal 38 and associated stem pin 124, thereby adjusting a flow of the fluid between the primary inlet 20 and the primary output 28 (discussed in further detail below).

A pressure regulating valve 60 is positioned in the central channel 18 of the primary regulator body 16 and is configured to regulate the flow of gas from the primary inlet 20 to the output channel 22, thereby ultimately regulating an output of gas from the source 12 of fluid to the consumer 14. The pressure regulating valve 60 includes a housing 62 that is removably received by the central channel 18 of the primary regulator body 16 and connectable to the primary regulator body 16 via a coupling mechanism 64A, 64B. It should be appreciated that the easy removability and replacement of the pressure regulating valve 60 via the coupling mechanism 64A, 64B allows the pressure regulating valve 60, and notably its seal seat 66 (discussed in further detail below) to be tested independently from the primary regulator body 16. This advantageously permits the pressure regulating valve 60 to be tested prior to being transported to a job site where it is installed.

Figure 2:
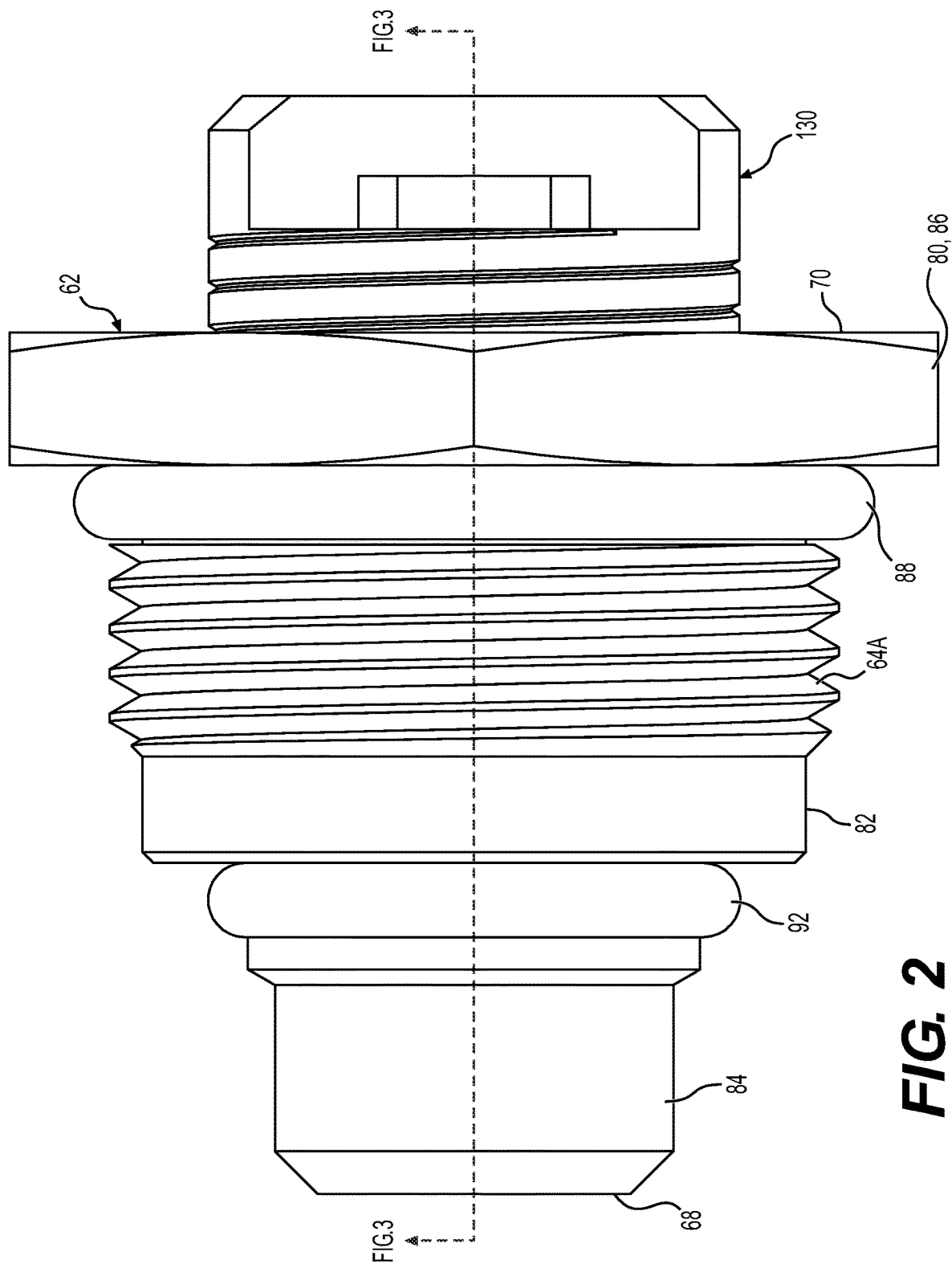
FIG. 2 is a side view of the pressure regulating valve.
Figure 3:
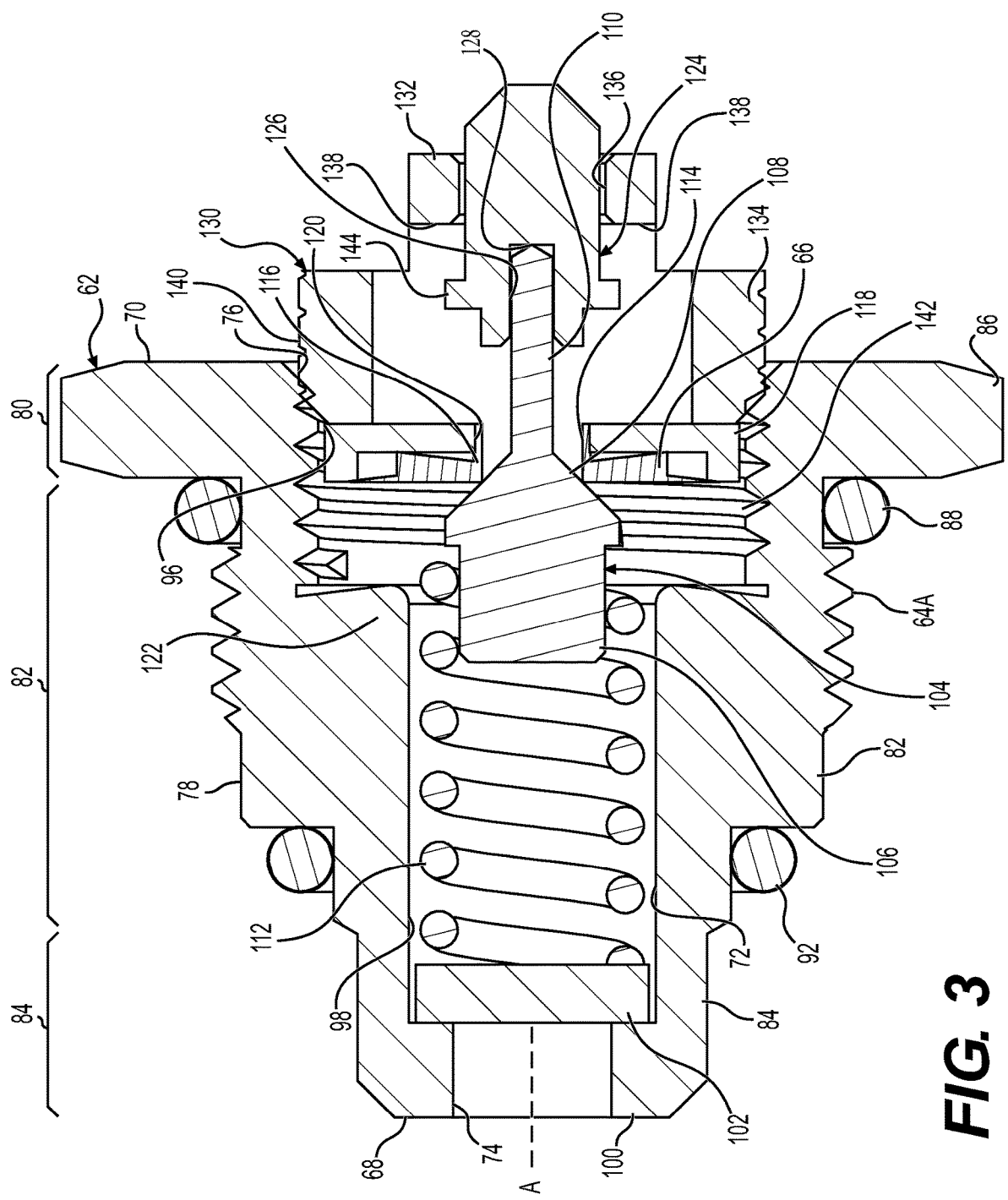
FIG. 3 is a cross-sectional view of the pressure regulating valve.

More particularly, as best shown in FIGS. 2 and 3, the housing 62 of the pressure regulating valve 60 extends about and along the axis A and extends axially between a bottom 68 and a top 70. The housing 62 defines a passage 72 that extends axially between an inlet 74 at the bottom 68 of the housing 62 and an outlet 76 at top 70 of the housing 62. The housing 62 also has an outer wall 78 that defines an upper region 80, a central region 82 and a lower region 84, wherein the upper region 80 has a larger radius than the central region 82, and the central region 82 has a larger radius than the lower region 84.

According to the example embodiment, the coupling mechanism 64A, 64B takes the form of a plurality of outside threads 64A defined along the central region 82 of the outer wall 78 and a plurality of inside threads 64B in the central channel 22 of the primary regulator body 16. It should be appreciated that the coupling mechanism 64 could include various other styles of coupling mechanisms including, but not limited to, an arrangement of tabs, an interference fit, or an adhesive.

The upper region 80 of the housing presents a hexagonal region 86 at the top 70 of the housing 62 for facilitating rotating of the housing 62 relative to the primary regulator body 16 with a tool, such as a wrench, to provide tightening and loosing of the outside and inside threads 64A, 64B. A first outer seal 88 is located at a meeting between the upper region 80 and the central region 82 for sealing the housing 62 relative to the primary regulator body 16 along an upper step 90 of the primary regulator body 16 in the central channel 18. A second outer seal 92 is located at a meeting between the central region 82 and the lower region 84 for further sealing the housing 62 relative to the primary regulator body 16 along a lower step 94 of the primary regulator body 16 in the central channel 18.

Figure 4:
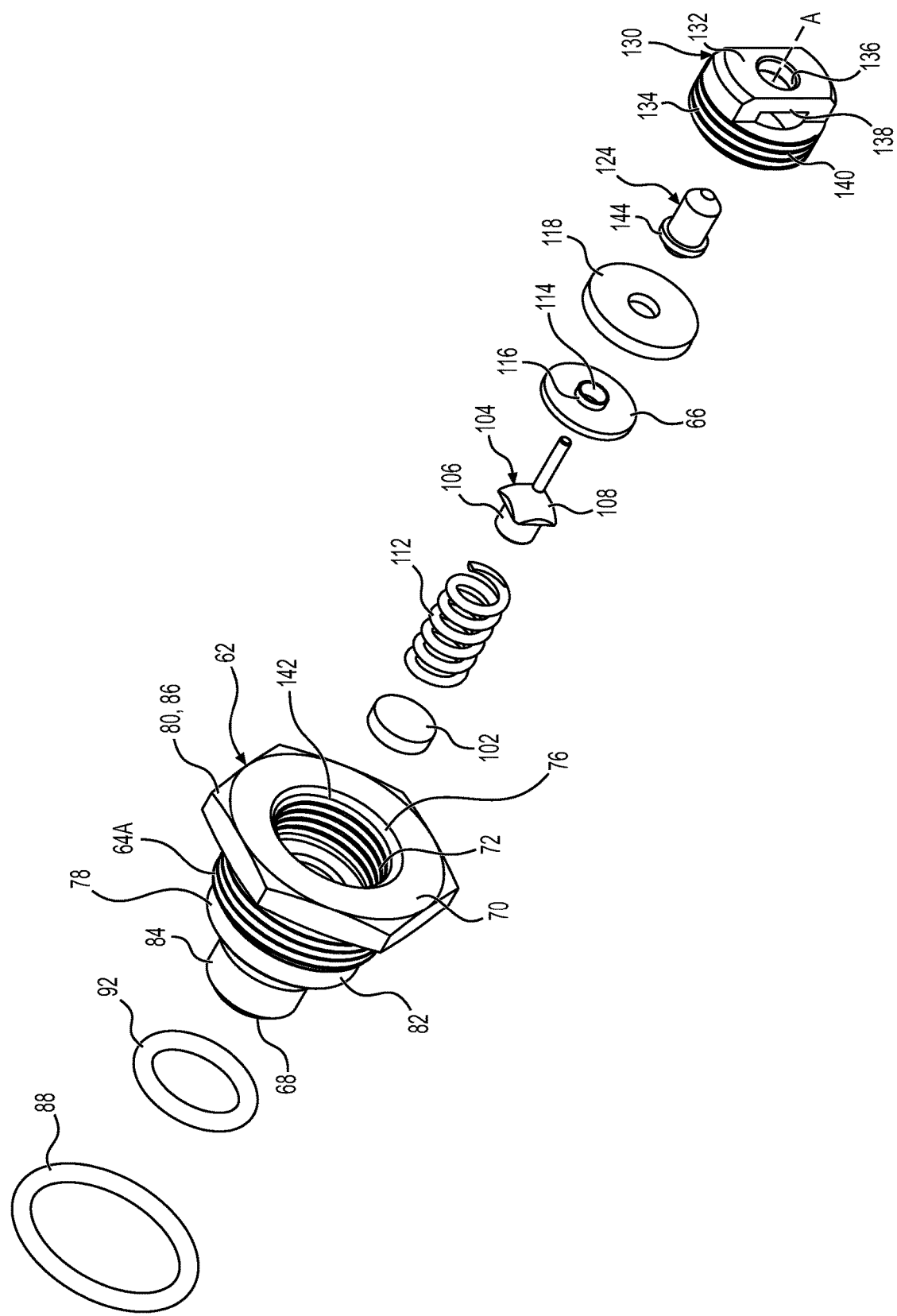
FIG. 4 is an exploded view of the pressure regulating valve.

The passage 72 defines a top region 96 and a bottom region 98, where a radius of the top region 96 is larger than a radius of the bottom region 98. The housing 62 further defines a bottom flange 100 that extends radially into the passage 72 at the bottom region 98 of the passage 72, such that the bottom flange 100 defines the inlet 74. As illustrated in FIGS. 3 and 4, a filter 102 may be positioned axially against the bottom flange 100 for filtering the gas as it enters the passage 72.

A seat stem 104 is positioned in the passage 72 of the housing 62 and is axially moveable in the passage 72. The seat stem 104 has a cylindrical portion 106 that extends along the axis A, and a cap portion 108 that is positioned axially on top of the cylindrical portion 106. The cap portion 108 extends radially outwardly relative to the cylindrical portion 106, and has a radially inwardly sloping shape as it extends axially. A rod portion 110 is located axially on top of the cap portion 108 and extends axially relative to the cap portion 110.

A lower biasing element 112 is located in the passage 72 and, as shown in FIG. 3, may extend axially between the filter 102 and a bottom of the cap portion 108 of the seat stem 104. Alternatively, as shown in FIG. 1, the lower biasing element 112 may extend between the bottom flange 100 and the bottom of the cap portion 108. The lower biasing element 112 partially surrounds the cylindrical portion 106 of the seat stem 104. The lower biasing element 112 biases the seat stem 104 axially upwardly. In the example embodiment, the lower biasing element 112 is a spring, but other styles of biasing elements could be used.

The seal seat 66 is positioned axially against the cap portion 108 of the seat stem 104. The seal seat 66 is made of a flexible sealing material, such as Teflon®. As best shown in FIGS. 3 and 4, the seal seat 66 generally has a washer shape and defines an opening 114 along the axis A for permitting gas to flow therethrough when the pressure regulating valve 60 is in an open position (discussed below). A tube-shaped protrusion 116 extends upwardly from a top surface of the seal seat 66 around the opening 114.

A seat retainer 118 is positioned in the passage 72 axially about the seat seal 66. The seat retainer 118 generally has a washer shape. The seat retainer 118 is configured to inhibit axially upward movement of the seal seat 66. The seat retainer 118 defines an orifice 120 along the axis in alignment with the opening 114 of the seal seat 66, and which axially receives the protrusion 116 of the seal seat 66.

The housing 62 further defines a sealing step 122 at the meeting of the top region 96 and the bottom region 98 of the passage 72. As shown in FIG. 1, once assembled, the seal seat 66 is compressed axially between the seat retainer 118 and the sealing step 122.

During use, the seat stem 104 is moveable along the axis A between a closed position in which the cap portion 108 of the seat stem 104 engages the seal seat 66 and prevents a flow of the fluid through the opening 114 of the seal seat 66, and an open position in which the seat stem 104 is spaced axially from the seal seat 66 and permits a flow of the fluid through the opening 114.

The stem pin 124 is located exactly above the seat stem 104 and is axially moveable. The stem pin 124 defines a bore 126 along the axis A that is configured to receive the rod portion 110 of the seat stem 104. The bore 126 terminates at an end 128 that engages a terminal end of the rod portion 110 such that downward axial movement of the stem pin 124 causes downward axial movement of the seat stem 104 toward the open position. As best shown in FIG. 1, a top of the stem pin 124 engages the diaphragm seal 38 such that axial movement of the diaphragm seal 38 as a result of rotation of the adjustment screw 56 and axial movement of the diaphragm seal 38 causes corresponding axial movement of the stem pin 124 and seat stem 104. More particularly, downward axial movement of the stem pin 124 causes the seat stem 104 to move to the open position, while upward movement of the stem pin 124 causes movement of the seat stem 104 into the open position via a force applied by the biasing element 112.

A hollow stem nut 130 is received and coupled to the housing 62 in the top region 96 of the passage 72 at the top of the housing 62. The stem nut 130 has a dome portion 132 and a wall portion 134 axially below the dome portion 132. The dome portion 132 defines a top opening 136 along the axis A, and one or more radial outlets 138 through which the fluid flows after flowing through the opening 114 of the seal seat 66 such that the fluid may subsequently pass through one of the outlets 24, 28. The wall portion 134 of the stem nut 130 defines a plurality of outside threads 140 for being threadedly coupled to a plurality of inside threads 142 defined by the housing 62 inside the passage 72 to permit the stem nut 130 to move axially in response to rotation of the stem nut 130. FIG. 3 shows a position in which the stem nut 130 in an untightened position, and FIG. 1 shows the stem nut 130 in a tightened position.

The stem pin 124 partially extends axially through the top opening 136 of the stem nut 130 such that it may axially move relative to the stem nut 130. The stem pin 124 presents an annular flange 144 that extends radially at a location axially adjacent to a bottom of the stem pin 124. The annular flange 144 inhibits axial upward movement of the stem pin 124 by engaging the dome portion 130 of the stem nut 130.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in that particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or later, or intervening element or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to described various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment (including all of the described embodiments), even if not specifically shown or described. The same may also be varied in many ways. Such variations are not to be regarded as a departure from the disclosure, and all such modifications are intended to be included within the scope of the disclosure.

What is claimed is:

1. A pressure regulating valve for a pressure regulating assembly for regulating a flow of a fluid from a source of the fluid to a fluid consumer, the pressure regulating valve comprising:
    a passage extending along an axis between an inlet and an outlet, wherein the fluid is configured to flow in a downstream direction between the inlet and the outlet;
    a seal seat positioned in the passage and defining an opening;
    a seat stem positioned in the passage and moveable between a closed position in which the seat stem engages the seal seat and prevents a flow of fluid through the opening of the seal seat to prevent fluid from flowing between the inlet and outlet, and an open position in which the seat stem is spaced from the seal seat and permits a flow of the fluid through the opening of the seal seat and between the inlet and outlet;
    a seat retainer positioned in the passage adjacent to the seal seat with the seal seat positioned axially between the seat retainer and the seat stem for inhibiting axial movement of the seal seat; and
    a stem nut in the passage downstream of the seat retainer and axially against the seat retainer for axially holding the seat retainer in place.

2. The pressure regulating valve as set forth in claim 1, further including a stem pin engaging the seat stem and moveable for providing movement to the seat stem in response to effectuated movement of the stem pin by an operator.

3. The pressure regulating valve as set forth in claim 2, wherein the stem pin defines a bore terminating at an end, and wherein the seat stem defines a rod portion and extends through the opening of the seal seat and received by the bore of the stem pin and engaging the end of the bore of the stem pin such that movement of the stem pin is transferred to the seat stem.

4. The pressure regulating valve as set forth in claim 3, a filter is positioned adjacent to the inlet for filtering the fluid as it enters the passage through the inlet.

5. The pressure regulating valve as set forth in claim 4, wherein a spring extends axially between the filter and the seat stem.

6. The pressure regulating valve as set forth in claim 1, wherein the pressure regulating valve defines a sealing step extending radially in the passage, and wherein the seal seat is compressed axially between the seat retainer and the sealing step.

7. The pressure regulating valve as set forth in claim 1, wherein the seat retainer defines an orifice along the axis for allowing the fluid to flow therethrough after flowing through the opening of the seal.

8. The pressure regulating valve as set forth in claim 1, wherein the stem nut generally has a hollow cap shape with a dome portion and a wall portion, and wherein the stem nut defines at least one radial outlet along the wall portion of the stem nut through which the fluid flows after flowing through the opening of the seal seat.

9. The pressure regulating valve as set forth in claim 8, wherein the wall portion of the stem nut defines outside threads for being threadedly coupled to inside threads defined inside the passage to cause the stem nut to move axially in response to rotation of the stem nut.

10. The pressure regulating valve as set forth in claim 9, wherein the stem nut defines a top opening along the axis at a top of the dome portion of the stem nut, and wherein a stem pin partially extends axially through the top opening and axially engages the seat stem and is axially moveable for providing movement to the seat stem in response to effectuated movement of the stem pin by an operator.

11. The pressure regulating valve as set forth in claim 10, wherein the stem pin presents an annular flange extending radially outwardly at or adjacent to a bottom of the stem pin, and wherein the annular flange inhibits axial movement of the stem pin by engaging the dome portion of the stem nut.

12. The pressure regulating valve as set forth in claim 1, wherein the seat stem has a cap portion having a radially inwardly sloping shape as a top surface of the cap portion extends axially, and wherein the cap portion is configured to engage the seal seat.

13. The pressure regulating valve as set forth in claim 12, wherein the seat stem further includes a cylindrical portion extending axially from the cap portion, and wherein a biasing element surrounds the cylindrical portion.

* * * * *